US006192040B1

(12) United States Patent
Jalloul et al.

(10) Patent No.: US 6,192,040 B1
(45) Date of Patent: Feb. 20, 2001

(54) METHOD AND APPARATUS FOR PRODUCING CHANNEL ESTIMATE OF A COMMUNICATION CHANNEL IN A CDMA COMMUNICATION SYSTEM

(75) Inventors: Louay A. Jalloul, Palatine; Eugene J. Bruckert, Arlington Heights, both of IL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/293,318

(22) Filed: Apr. 16, 1999

(51) Int. Cl.[7] ............................................. H04J 13/02

(52) U.S. Cl. ......................... 370/335; 370/342; 370/441

(58) Field of Search .................................. 370/335, 342, 370/441; 375/147

(56) References Cited

U.S. PATENT DOCUMENTS 5,886,987 * 3/1999 Yoshida et al. ...................... 370/318

* cited by examiner

*Primary Examiner*—Melvin Marcelo
(74) *Attorney, Agent, or Firm*—Sayed H. Beladi; Kenneth A. Haas

(57) ABSTRACT

A method and apparatus in WCDMA communication system includes extracting pilot symbols (462-5) of (2-M) plurality of communication channels of (1-M) plurality of communication channels based on corresponding 2-M assigned codes (405–436) to produce a plurality (2-M) of extracted pilot symbols (482–96), and combining a first (1) extracted pilot symbol (420) of a first (1) communication channel of (1-M) plurality of communication channels and the plurality (2-M) of extracted pilot symbols (482–96), to produce a combined extracted pilot symbol (498) which is used to produce a combined channel estimate (417) for decoding a first (1) extracted data symbol (414) of first (1) communication channel of (1-M) plurality of communication channels.

10 Claims, 2 Drawing Sheets

METHOD AND APPARATUS FOR PRODUCING CHANNEL ESTIMATE OF A COMMUNICATION CHANNEL IN A CDMA COMMUNICATION SYSTEM

FIELD OF THE INVENTION

The invention generally relates to communication systems, and in particular, a code division multiple access communication system.

BACKGROUND OF THE INVENTION

In code division multiple access (CDMA) communication systems, such as the well known system based on the IS-95 standard, a pilot signal, considered a pilot channel, transmitted from a base station contains data that are known by all mobile stations compatible with the system. Each mobile station communicating with the base station receives the pilot signal to extract important information about phase rotation, channel gain estimation, signal-to-noise plus interference ratio estimation, and others. Such important information collectively or individually are referred to as the channel estimate. A mobile station decodes a data signal considered a data channel, also transmitted from the base station to the mobile station uses the channel estimate to perform coherent demodulation of the data channel symbols. The transmitted signal carries information data such as voice. The mobile station performance of decoding the data symbols directly depends on the accuracy of the channel estimate.

In another well-known system based on the Wideband CDMA (WCDMA) standard, the pilot signal is embedded with the data signal. Therefore, each signal, considered a communication channel, transmitted from a base station to a mobile station contains pilot and data symbols. The terms: bits and symbols are used interchangeably. A mobile station receives a burst of symbols that contains the pilot and data, and other controlling data information. The burst of data containing the pilot and data symbols spread over a wide frequency spectrum according to a predefined code sequence known to all mobile stations compatible with the system. All mobile stations compatible with the system also know the content of the pilot data. A mobile station receiving a burst of data decodes the pilot data bits by knowing the spreading code and processes the pilot data symbols to determine the channel estimate. The channel estimate is used for coherently demodulating the data symbols. One ordinary skilled in the art may appreciate that the number of pilot data symbols in the transmitted signal directly effects the accuracy of the channel estimation, however, the data burst is of a limited duration and its time limit can not be used to transmit large number of pilot symbols in comparison with the number of data symbols in the same burst in order to improve the accuracy of the channel estimate. The pilot data symbols are considered overhead data and affect the throughput efficiency of the communication system. The communication system operating based on the IS-95 standard may not have such a problem because the pilot signal is transmitted separately at a relatively high power level and the mobile station may decode as many pilot data bits as it may require to assure an adequate and accurate channel estimate.

Therefore, there is a need for a method and apparatus for decoding data information based on accurate channel estimation derived from a limited number of pilot data bits in a data burst in a WCDMA communication system.

DESCRIPTION OF THE PREFERRED EMBODIMENT(S)

According to one or more aspects of the invention, a communication system provides wireless communication between a base station and a plurality of mobile stations via a plurality (1 through M) of communication channels. Each of the plurality (1 through M) of communication channels includes data and pilot symbols. The data and pilot symbols in each communication channel are spread over a wide frequency spectrum according to at least a predefined code. The code is selected from a predefined set of M orthogonal spreading codes. A method of producing a combined channel estimate for demodulating a first data symbol of a first (1) communication channel of the plurality (1 through M) of communication channels includes extracting data and pilot symbols of the first (1) communication channel based on a first (1) predefined spreading code assigned to the first (1) communication channel to produce a first (1) extracted data symbol and a first (1) extracted pilot symbol, and determining a first channel estimate based on the first (1) extracted pilot symbol. The method further includes extracting pilot symbols of a remaining (2 through M) plurality of assigned spreading codes to produce a plurality (2 through M) of extracted pilot symbols, and combining the first (1) extracted pilot symbol and the plurality (2 through M) of extracted pilot symbols to produce a combined extracted pilot symbol. The method further includes determining a second channel estimate based on the combined extracted pilot symbol, and combining the first and second channels estimates to produce the combined channel estimate. Determining each of the channel estimates may be based on several related pilot symbols in a data burst. The method further includes multiplying the combined channel estimate and the first (1) extracted data symbol to produce the first demodulated data symbol. The method is specifically adopted for demodulating data symbols of a forward communication channel link from a base station to a mobile station. As a result, an accurate channel estimate, the combined channel estimate, derived from a limited number of pilot data symbols, in a manner as described above, in a WCDMA communication system is used to decode and demodulate data symbols in presence of low signal to noise interference to improve and reduce symbol error rate of the decoded symbols.

Figure 1:
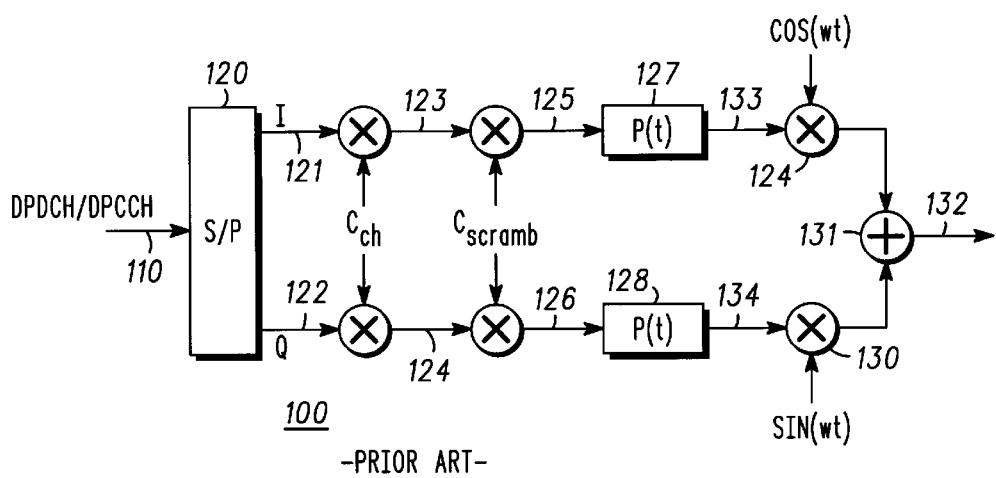
FIG. 1 depicts a block diagram of a transmitter in a base station according to the prior art.
Figure 2:
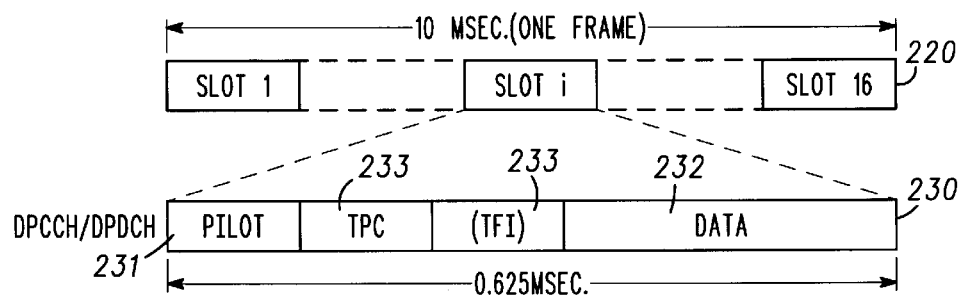
FIG. 2 depicts a radio frame format according to WCDMA standards.

Referring to FIGS. 1 and 2, in FIG. 1, a block diagram 100 of a transmitter in a base station according to the prior art is shown. A forward link dedicated physical data channel (DPDCH) and forward link dedicated physical control channels (DPCCH) are time multiplexed within each radio frame. The radio frame format is shown in FIG. 2. The DPDCH contains data symbols and DPCCH contains pilot symbols. In a communication system compatible with WCDMA, commonly refer to as Universal Mobile Terminal System (UMIS), there are 512 scrambling codes (Cscramb) derived from a set of orthogonal variable spreading factors. Each Cscramb is divided into 32 code groups, and each code group includes 16 orthogonal channel codes (Cch1–Cch16, for short, C1–C16.) Each Cscramb is assigned to a base station in the communication system. Each base station provides communication coverage to a number of mobile stations roaming in a coverage area served by the base station. The signals transmitted between the base station and all mobile stations within its coverage area are coded with Cscramb assigned to the base station. It may be possible that the coverage of a base station is divided into several sectors. Thus, each sector is assigned a different Cscramb, and the signals transmitted for the mobile stations in each sector are coded according to the assigned Cscramb. The signal targeted for each mobile station is also coded according to one of C1–C16 orthogonal codes.

Referring to FIG. 1, in block diagram 100, signal DPDCH/DPCCH 110 targeted for a mobile station passes through a serial to parallel (S/P) block 120 to produce I signal 121 and Q signal 122 of signal 110. Signals 121 and 122 are each spread first with one of the sixteen C1–C16 orthogonal codes for the targeted mobile station. The spread signals 123 and 124 are multiplied by the assigned Cscramb code to produce signals 125 and 126. Both signals 125 and 126 pass through transmit pulse shaping filters 127 and 128 respectively to produce signals 133 and 134. Signals 133 and 134 are up-converted to a carrier frequency at multipliers 129 and 130, and summed in summer 131 to produce a combined signal 132 suitable for amplification and transmission by other blocks not shown. A time frame 220 shown in FIG. 2 consists of 16 time slots. Each time slot such as a time slot 230 consists of pilot bits 231 (symbols), data bits 232 (symbols), and control data 233.

Figure 3:
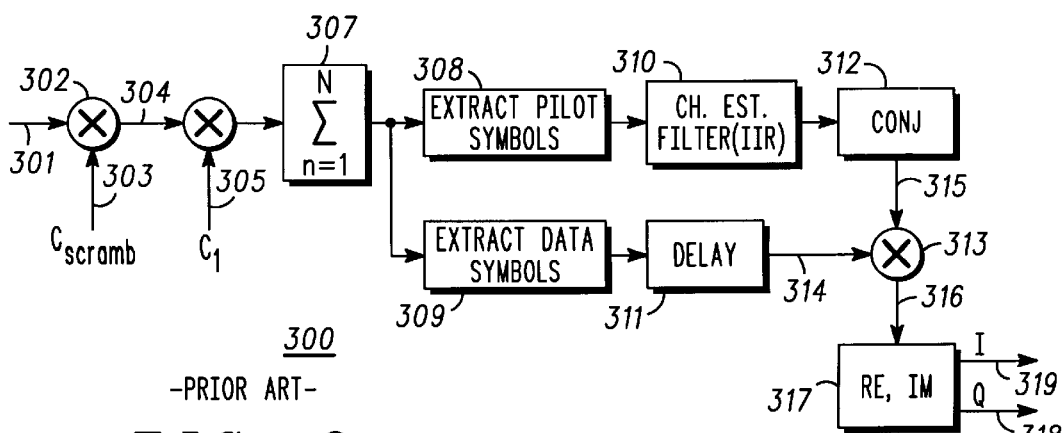
FIG. 3 depicts a block diagram of a receiver portion in a mobile station, compatible with WCDMA system, according to the prior art is shown.

Referring to FIG. 3, a block diagram 300 of a receiver portion in a mobile station, compatible with WCDMA system, according to the prior art is shown. A signal 301 received at the receiver 300 is de-spread by Cscramb code 303 assigned to the base station that originated the signal 301 to produce signal 304. Signal 304 is despread again according to a code 305 (for example C1 of C1–C16) specifically assigned to the mobile station. The result of the de-spreading function is summed in block 307 for a length of coded symbols. Normally, in CDMA system, one chip rate plus the symbol rate is equal to 256 chips in a symbol. In that case, the number of symbols accumulated is equal to 256, thus, N=256. Since signal 301 is time slotted, according to time slot 230 shown in FIG. 2, and each time slot contains both the data and pilot symbols, pilot symbols and data symbols are extracted in blocks 308 and 309 respectively. Other blocks extracting, for example, control data are not shown. In practical application, all the extracting blocks may be incorporated together in a single block. The partitions are shown for clarity. The extracted pilot symbol passes through channel estimator filter 310 and conjugated in block 312 to produce channel estimate 315. Extracted data symbols at the output of block 309 passes through a delay block 311 to produce delayed data symbols 314 to match the processing delay of the pilot symbols. Data symbols 314 and channel estimate 315 are multiplied in a multiplier 313 to produce the final decoded data symbol 316. Data symbol 316 may be in a complex format consisting of real and imaginary parts. The real and imaginary parts are separated in block 317 to produce real and imaginary data symbols 319 and 318. Data symbols 318 and 319 are further used in the receiver to, for example, complete the communication between the base station and the mobile station. Since the channel estimate 315 is based only on the extracted data symbols contained in the signal 301, the channel estimate may not be accurate due to the limited number of pilot symbols in signal 301. As a result, the decoded data symbols 316 would have high or inadequate symbol error rate, particularly when signal 301 has low signal to noise plus interference ratio.

According to one or more aspects of the invention, since the method includes extracting pilot symbols of a remaining (2 through M) plurality of communication channels based on corresponding 2 through M assigned codes, C2–C16, to produce a plurality (2 through M) of extracted pilot symbols, and combining the first (1) extracted pilot symbol and the plurality (2 through M) of extracted pilot symbols to produce a combined extracted pilot symbol, the combined extracted pilot symbol would have more signal energy with respect to interference or noise. Therefore, the combined channel estimate produced by determining a second channel estimate based on the combined extracted pilot symbol and combining the first and second channels estimates is more accurate than the first channel estimate. The first decoded data symbol, therefore, would be at a lower symbol error rate at low signal to noise plus interference ratio of the signal of the first communication channel.

Figure 4:
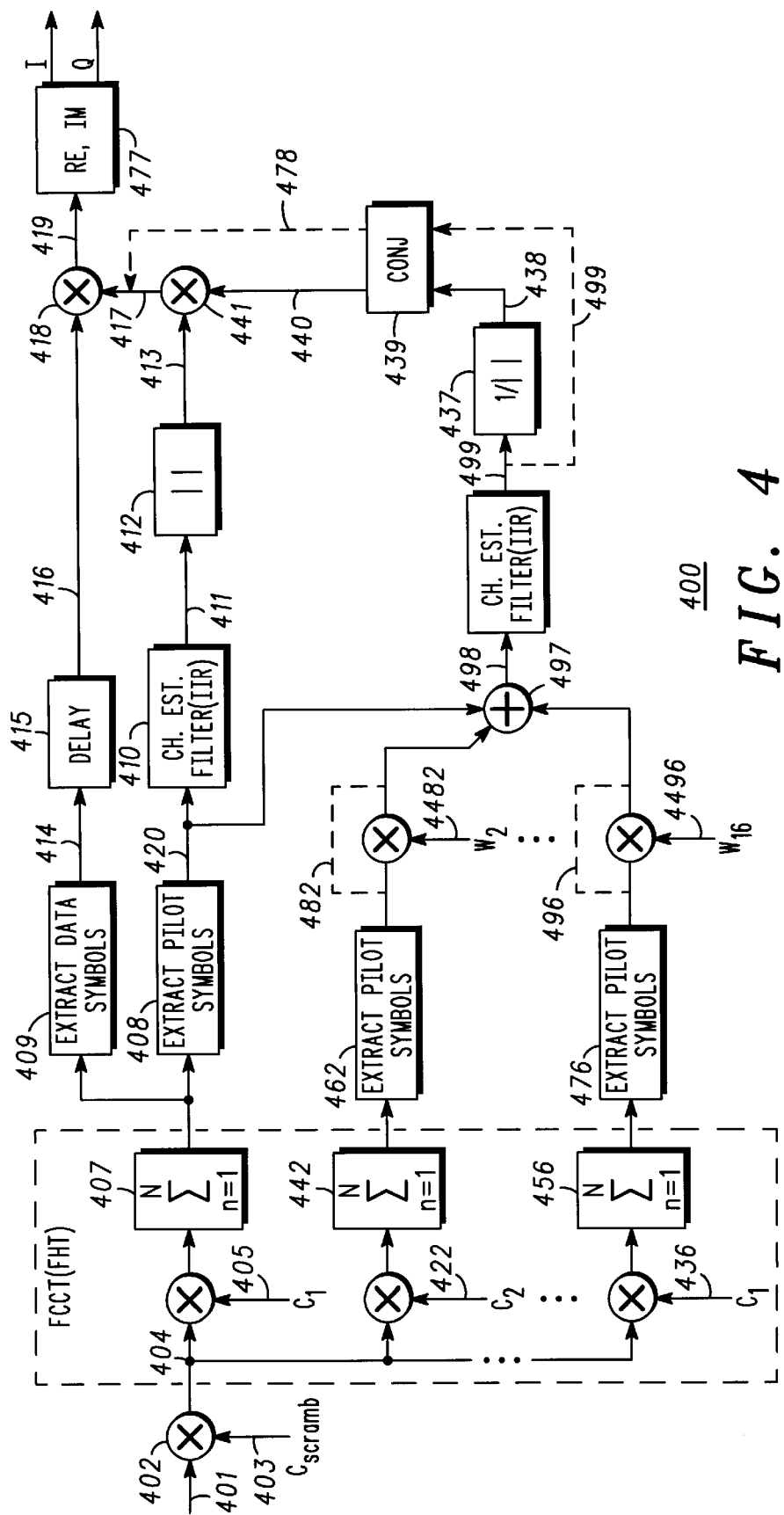
FIG. 4 depicts a receiver block diagram including one or more aspects of the invention.

Referring to FIG. 4, one or more aspects of the invention are more clearly shown by way of reference to a receiver block diagram 400 shown in FIG. 4. A mobile station may receive signals of all communication channels transmitted from a base station, even though, only one of the signals is targeted for the mobile station. Therefore, when a mobile station opens its receiver to receive signals, it receives all signals capable of receiving. One ordinary skilled in the art may appreciate that signals transmitted from a single source, such as a base station and received by a single mobile station, all experience similar channel characteristics. Therefore, additional channel information may be obtained by decoding the pilot symbols of the signals other than the one targeted for the mobile station to determine a combined channel estimate that is more accurate than if its was determined solely based on the pilot data contained in the signal targeted for the mobile station. A signal 401 shown in FIG. 4 is shown collectively to represent all signals transmitted from a base station that the mobile station was able to receive including the one that was targeted for the mobile station.

The signal 401 received at the receiver 400 is de-spread by Cscramb code 403 assigned to the base station that originated the signal 401 to produce a signal 404. Signal 404 is de-spread again according to a code 405 (for example C1 of C1–C16) specifically assigned to the communication channel targeted for the mobile station. The result of the de-spreading function is summed in block 407 for a is length of coded symbols, for example 256 symbols. Since signal 401 is time slotted, according to time slot 230 shown in FIG. 2, and each time slot contains both the data and pilot symbols, pilot symbols and data symbols are extracted in blocks 408 and 409 respectively. Other blocks extracting, for example, control data are not shown. In practical application, all the extracting blocks may be incorporated together in a single block. The partitions are shown for clarity. Extracted data symbol 414 at the output of block 409 passes through a delay block 415 to produce a delayed data symbol 416 to match the processing delay of the pilot symbol for producing a combined channel estimate 417. The combined channel estimate 417 is multiplied by data symbol 416 in multiplier 418 to produce a decoded data symbol 419. Data symbol 419 may be in complex format, which then are separated into real and imaginary parts in block 477.

The extracted pilot symbol 420 passes through channel estimator filter 410 to produce a channel estimate 411. A block 412 takes the absolute value of channel estimate 411 to produce an amplitude component 413 of the combined channel estimate 417. For example, in the complex format based on "e", $Ae^{j\theta}$, "A" is the amplitude component, and "θ"

is the phase component. The function of taking the amplitude component, other than taking the absolute value, may be implemented by other means known to one ordinary skilled in the art.

Signal 404 is de-spread again according to codes 422–36 (for example C2–C16) that may specifically be assigned for communication channels with other mobile stations served by the same base station. The result of each de-spreading, C2–C16, is summed in blocks 442–56 respectively for a length of coded symbols, for example 256 symbols. The pilot symbols of each of the de-spreading functions are extracted respectively in blocks 462–76. The extracted pilot symbols are respectively produced at 482–96. The extracted pilot symbols 482–496 and 420 of the first channel pass, pilot symbols 482–496 shown to pass by dotted line, to a summer 497 to be summed to produce a combined pilot symbol 498. A channel estimator filter inputs combined pilot symbols 498 to produce a channel estimate 499. A block 437 inputs the channel estimate 499 and takes its absolute value and inverts to produce signal 438 which is conjugated in block 439 to produce a phase component 440 of the combined channel estimate 417. The amplitude component 413 and phase component 440 are multiplied in multiplier 441 to produce combined channel estimate 417. The combined channel estimate 417 is more accurate since is based on pilot data bits derived from the communication channels originated from a single base station.

Among many reasons for taking the phase component 438 and amplitude component 413 to form the combined channel estimate 417 is to produce combined channel estimates for each slot time of a frame that provides a constant pilot to data power ratio because the power level during some time slots may be higher than others. As a result, the addition of power to the pilot data symbol 498 from 2 through M communication channels would have nearly an equal effect for every slot time in a frame by taking only the phase component 438. The effect of fluctuation of pilot to data power ratio across several time slots is nullified over the combined channel estimate 417.

In an embodiment of the invention the effect of fluctuating pilot to data power ratio across time slots may be ignored if its effect is determined to be nominal for decoding data symbols. The extracted pilot symbol 420 is not used to produce the channel estimate 411. In essence, the processings in blocks 410, 412, 437 and 441 are not performed. The channel estimate 499 passes, instead, through conjugate block 439 directly to produce channel estimate 478. The result is substituted for the combined channel estimate 417. The channel estimate 478 has channel characteristics of the first communication channel that is specifically targeted for the mobile station through the pilot symbol 420 being summed with other pilot symbols at summer 497.

In WCDMA communication system there are sixteen orthogonal codes, C1–C16, from each code group that each may be assigned to a mobile station. However, all sixteen codes may not be in use at all times depending on the number of the mobile stations in the coverage area. To prevent adding noise to the combined pilot data symbol 498 due to unused codes, the invention includes multiplying each extracted pilot symbol 482–96 by a weighting factor, W2–W16, 4482–96, respectively, before being summed in summer 497.

To determine each weighting factors, 4482–96, the invention includes correlating the first extracted pilot symbol sequence, pilot symbol 420 with each of the plurality (2 through M) of extracted pilot symbol sequences, 482–496, to produce the corresponding plurality of weighting factors 482–96.

What is claimed is:

1. In a communication system that provides wireless communication between a base station and a plurality of mobile stations via a plurality (1 through M) of communication channels, wherein each of said plurality (1 through M) of communication channels includes data and pilot symbols, coded according to at least a predefined code, selected from 1 through M predefined codes, assigned to each of said plurality (1 through M) of communication channels, a method of producing a combined channel estimate for decoding a first data symbol of a first (1) communication channel comprising the steps of:

extracting data and pilot symbols of said first (1) communication channel based on a first (1) predefined code assigned to said first (1) communication channel to produce a first (1) extracted data symbol and a first (1) extracted pilot symbol;

extracting pilot symbols of a remaining (2 through M) plurality of communication channels based on corresponding 2 through M assigned codes to produce a plurality (2 through M) of extracted pilot symbols;

determining a first channel estimate based on said first (1) extracted pilot symbol;

combining said first (1) extracted pilot symbol and said plurality (2 through M) of extracted pilot symbols to produce a combined extracted pilot symbol;

determining a second channel estimate based on said combined extracted pilot symbol;

combining said first and second channel estimates to produce said combined channel estimate.

2. The method as recited in claim 1 further comprising the step of:

multiplying said combined channel estimate and said first (1) extracted data symbol to produce said first decoded data symbol.

3. The method as recited in claim 1 wherein each of said first and second channel estimates are base on more than one related decoded pilot symbols.

4. The method as recited in claim 1 wherein said combining said first and second channel estimates to produce said combined channel estimate and said combined channel estimate is in complex format, said first channel estimate forms an amplitude component of said combined channel estimate and said second channel estimate forms a phase component of said combined channel estimate.

5. The method as recited in claim 1 comprising the step of multiplying said plurality (2 through M) of extracted pilot symbols by a corresponding plurality of weighting factors before said step of combining said first (1) extracted pilot symbol and said plurality (2 through M) of extracted pilot symbols to produce said combined extracted pilot symbol.

6. The method as recited in claim 5 wherein said plurality of weighting factors are produce by a method comprising the step of correlating said first extracted pilot symbol sequence with each of said plurality (2 through M) of extracted pilot symbol sequences to produce said corresponding plurality of weighting factors.

7. The method as recited in claim 1 wherein said communication system is a WCDMA communication system.

8. The method as recited in claim 1 wherein said plurality of communication channels are according to a combination of code division multiple access and time division multiple access transmitted in a time division frame format wherein each time slot in said time division frame format includes said pilot data symbols and data symbols.

9. In a communication system that provides wireless communication between a base station and a plurality of mobile stations via a plurality (1 through M) of communication channels, wherein each of said plurality (1 through M) of communication channels includes data and pilot symbols, spread according to at least a predefined code, selected from 1 through M predefined orthogonal codes, assigned to each of said plurality (1 through M) of communication channels, a method of producing a combined channel estimate for decoding a first data symbol of a first (1) communication channel comprising the steps of:

extracting data and pilot symbols of said first (1) communication channel based on a first (1) predefined code assigned to said first (1) communication channel to produce a first (1) extracted data symbol and a first (1) extracted pilot symbol;

extracting pilot symbols of a remaining (2 through M) plurality of communication channels based on corresponding 2 through M assigned codes to produce a plurality (2 through M) of extracted pilot symbols;

combining said first (1) extracted pilot symbol and said plurality (2 through M) of extracted pilot symbols to produce a combined extracted pilot symbol;

determining said combined channel estimate based on said combined extracted pilot symbol.

10. In a communication system that provides wireless communication between a base station and a plurality of mobile stations via a plurality (1 through M) of communication channels, wherein each of said plurality (1 through M) of communication channels includes data and pilot symbols, coded according to at least a predefined code, selected from 1 through M predefined codes, assigned to each of said plurality (1-M) of communication channels, an apparatus for producing a combined channel estimate for decoding a first data symbol of a first (1) communication channel comprising the steps of:

means for extracting data and pilot symbols of said first (1) communication channel based on a first (1) predefined code assigned to said first (1) communication channel to produce a first (1) extracted data symbol and a first (1) extracted pilot symbol;

means for extracting pilot symbols of a remaining (2-M) plurality of communication channels based on corresponding 2-M assigned codes to produce a plurality (2-M) of extracted pilot symbols;

means for determining a first channel estimate based on said first (1) extracted pilot symbol;

means for combining said first (1) extracted pilot symbol and said plurality (2-M) of extracted pilot symbols to produce a combined extracted pilot symbol;

means for determining a second channel estimate based on said combined extracted pilot symbol;

means for combining said first and second channel estimates to produce said combined channel estimate.

\* \* \* \* \*